UNITED STATES PATENT OFFICE.

JOSEPH BONNET, OF PARIS, FRANCE.

PROCESS OF PRODUCING EXPLOSIVES.

SPECIFICATION forming part of Letters Patent No. 695,667, dated March 18, 1902.

Application filed December 5, 1900. Serial No. 38,795. (No specimens.)

*To all whom it may concern:*

Be it known that I, JOSEPH BONNET, a citizen of the Republic of France, and a resident of Paris, France, have invented new and useful Improvements in Processes of Producing Explosives, which improvements are fully set forth in the following specification.

Other inventors have already before this indicated the solubility at a high temperature of nitro or azo derivatives in vegetable or animal oils or fats or fatty substances. It is known that these fat-forming substances are ethers of fatty acids—solids in the majority of cases—combined with glycerin. Thus stearic acid combined with glycerin is found in fat-forming substances, such as beef-fat, mutton-fat, cocoa-butter, olive-oil, and the like. It is even found in a free state in the Indian-berry, (*Cocculus Indicus*.) Pure stearic acid melts at 75° and solidifies at 70°. Palmitic acid, which melts at 62°, is found in a free state in old palm-oil and in a combined state in the fresh oil. This acid is also present in a great number of vegetable or animal oils and fats. Oleic acid, which melts at 140°, is also present in such oils and fats, and the same may be said of sebacic acid, which melts at 127°, and so on.

I have discovered that nitrated, picrated, or picro-azoic derivatives are soluble in free fatty acids or in a mixture of such free fatty acids, in consequence of which I am able to produce substances the melting-point of which is higher than that of substances obtained by dissolving at a high temperature the same derivatives in oils or fats in which these fatty acids are combined in the form of an ether of glycerin. It will be evident that by mixing and thus covering by a process that will be described hereunder a supporter of combustion or oxidizing agent, such as the chlorates or perchlorates, alone or mixed in a hot solution of such fatty acids, it is possible to obtain after cooling the mass explosives of a nature specially adapted for hot climates, since they are only liable to become slightly softened, owing to the high melting-point of the enveloping material or vehicle.

I have also discovered that in order to raise the melting-point of substances obtained by dissolving the above-named derivatives in oils or fats it will be sufficient to add to the said oils or fats a greater or lesser proportion of free fatty acids.

It is well known that glycerin is not the only body which forms ethers with fatty acids, and I may cite by way of example, without, however, thereby exhausting the list, the combinations of stearic acid with methylic, ethylic, cetylic, and like alcohols, and that stearate of methyl melts at 85°, stearate of ethyl at 31°, and stearate of cetyl at from 55° to 60°, and finally that stearic acid also combines with glucose, mannite, dulcite, pinite, quercite, and the like to form with them ethers similar to stearin, palmitin, and the like, which are fatty bodies or ether the base of which is glycerin. I have discovered that all these ethers dissolve likewise nitrated or picrated derivatives in quantities more or less considerable, according to the temperature of the bodies employed.

I have also found that in a general way the solubility of one of these substances in another at a high temperature (a derivative in an acid or in ether of a base other than glycerin) increases as the temperature approaches that of the melting-point of the component substance whose point of melting is highest.

I have also found that certain of the above-named derivatives, which are but slightly soluble with heat in fatty acids or in a mixture of them or in one of the above-named ethers, when used by themselves become soluble to a greatly-increased degree at the same temperatures if they are previously dissolved in another more soluble derivative. Thus dinitrotoluene is almost insoluble in stearic acid at a temperature of 80°; but if first dissolved in mononitronaphthalene in a molten state, which dissolves considerable quantities of the former, it will be possible, owing to the great solubility of the mononitronaphthalene in stearic acid, to greatly increase the actual quantity of dinitrotoluene remaining in solution in the stearic acid as compared with the quantity dissolved at the same temperature if the process had not been modified in the manner indicated.

I make use of all these solutions when hot for mixing with them or embedding in them the supporter of combustion or oxidizing agent, and especially the chlorates or perchlorates, either alone or in mixture, with the view of obtaining after the mass has cooled an explosive which softens but slightly under high temperatures, and therefore is of great usefulness in hot countries. In order to manufacture these explosives, I first melt the fatty acid or a mixture of fatty acids or a mixture of an acid with a fatty substance or ethers of fatty acids a base other than glycerin, either alone or mixed with fatty acids or fatty substances, and then add the nitrated derivatives or derivatives of picric acid, either alone or mixed, as previously mentioned, and heat same to a temperature to effect solution. Having obtained the solution, I add in a hot state and little by little the supporter of combustion—say a chlorate or perchlorate—all the time constantly stirring the mass, so as to thoroughly incorporate the latter in the former, thereby obtaining as the final product a perfectly homogeneous mass, which is allowed to cool.

The following particulars may be given by way of example only of several mixtures which give very satisfactory results:

*Mixture with a fatty acid alone.*—Free fatty acid, (stearic acid,) twelve parts; dinitrobenzol, eight parts; chlorate of potassium, eighty parts.

*Mixture with a fatty acid and a fatty substance.*—Palmitic acid, six parts; oil or fat, two parts; derivative of picric acid—nitronaphthalene, ten parts, and picric acid, two parts; ammonium perchlorate, eighty parts.

*Mixture of a fatty acid with a preparatory solution of a nitro derivative.*—Stearic acid, six parts; mononitronaphthalene, twelve parts; potassium chlorate, eighty parts.

What I claim is—

1. The herein-described process of producing an explosive compound consisting in dissolving a nitro derivative in free fatty acid.

2. The herein-described process of producing an explosive compound consisting in dissolving a nitro derivative in free fatty acid and then adding a suitable substance to support combustion.

3. The herein-described process of producing an explosive compound consisting in dissolving a derivative of picric acid in free fatty acid.

4. The herein-described process of producing an explosive compound consisting in dissolving a derivative of picric acid in free fatty acid and then adding a suitable substance to support combustion.

In testimony whereof I have signed this specification, in the presence of two subscribing witnesses, this 21st day of November, 1900.

JOSEPH BONNET.

Witnesses:
EMILE LEDRET,
J. ALLISON BOWEN.